(12) United States Patent
Wu et al.

(10) Patent No.: US 9,305,104 B2
(45) Date of Patent: Apr. 5, 2016

(54) SYSTEMS AND METHODS FOR BEHAVIORAL PATTERN MINING

(75) Inventors: Changjun Wu, Rochester, NY (US); Shanmuga-Nathan Gnanasambandam, Webster, NY (US); Gueyoung Jung, Rochester, NY (US); Shi Zhao, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 508 days.

(21) Appl. No.: 13/529,111

(22) Filed: Jun. 21, 2012

(65) Prior Publication Data

US 2013/0346447 A1 Dec. 26, 2013

(51) Int. Cl.
*G06F 7/00* (2006.01)
*G06F 17/00* (2006.01)
*G06F 17/30* (2006.01)

(52) U.S. Cl.
CPC .... *G06F 17/30876* (2013.01); *G06F 17/30867* (2013.01)

(58) Field of Classification Search
CPC ............... G06F 17/30867; G06F 17/30011; G06F 17/30876; G06F 17/30861; G06F 17/30023; G06F 17/30241; G06F 17/30637; G06F 17/30699
USPC ........................................... 706/40, 48
See application file for complete search history.

(56) References Cited

U.S. PATENT DOCUMENTS

| | | | |
|---|---|---|---|
| 7,584,181 B2 * | 9/2009 | Zeng et al. | |
| 7,769,705 B1 * | 8/2010 | Luechtefeld | 706/47 |
| 8,166,026 B1 * | 4/2012 | Sadler | 707/725 |
| 2006/0041843 A1 * | 2/2006 | Billsus et al. | 715/714 |
| 2006/0129553 A1 * | 6/2006 | Simonds et al. | 707/6 |
| 2008/0095355 A1 | 4/2008 | Mahalaha et al. | |
| 2008/0141117 A1 * | 6/2008 | King et al. | 715/238 |
| 2011/0093415 A1 * | 4/2011 | Rhee et al. | 706/12 |
| 2011/0150206 A1 | 6/2011 | Pickford | |
| 2011/0276396 A1 * | 11/2011 | Rathod | 705/14.49 |
| 2013/0110758 A1 * | 5/2013 | Jung et al. | 706/47 |
| 2013/0268260 A1 * | 10/2013 | Lundberg et al. | 704/8 |

FOREIGN PATENT DOCUMENTS

WO    WO-2013090492 A1    6/2013

OTHER PUBLICATIONS

Agrawal et al., "Mining Association Rules between Sets of Items in Large Databases," Proceedings of the 1993 ACM SIGMOND Conference Washington DC, USA, May 1993.
Srikant et al., "Mining Sequential Patterns: Generalizations and Performance Improvements," Lecture Not4es in Computer Science, 1996, vol. 1057/1996, 1-17.

* cited by examiner

*Primary Examiner* — Susan Chen
(74) *Attorney, Agent, or Firm* — Fox Rothschild LLP (57) ABSTRACT

Methods and systems of performing data mining may include receiving a plurality of web log records and a plurality of call log records; associating one or more web log records with a call log record, wherein the associated user for each of the associated one or more web log records and the call log record are the same; identifying one or more patterns among the web log records for the plurality of call log records, wherein each pattern comprises one or more web accesses, a time stamp at which each of the one or more web accesses is performed and the call topic for the call log record; identifying one or more web log records associated with a new call, and predicting a call topic for the new call based on at least one pattern and the one or more web log records.

20 Claims, 5 Drawing Sheets

SYSTEMS AND METHODS FOR BEHAVIORAL PATTERN MINING

BACKGROUND

"Episode mining," or "frequent pattern mining," is a useful tool in various data-intensive services, such as human resource services, financial services and information technology services. Episode mining may generally refer to systems for determining subject matter patterns. By determining these patterns, episode mining systems may provide execution environments with a mechanism of quickly, accurately and efficiently completing tasks, such as, for example, communicating with customers.

Previous attempts to quickly, accurately and efficiently complete tasks have involved mining data to search for patterns, and then once the patterns have been discovered, utilizing those patterns in real-time for execution environments. However, further improvements to this approach remain necessary.

SUMMARY

In an embodiment, a method of performing data mining may include receiving a web log having a plurality of web log records, wherein each web log record comprises a web access, a time stamp and an associated user, receiving a call log having a plurality of call log records, wherein each call log record comprises a call topic, a time stamp and an associated user, for each call log record, associating, by a processing device, one or more web log records with the call log record, wherein the associated user for each of the associated one or more web log records and the call log record are the same, identifying, by the processing device, one or more patterns among the web log records for the plurality of call log records, wherein each pattern comprises one or more web accesses, a time stamp at which each of the one or more web accesses is performed and the call topic for the call log record, identifying, by the processing device, one or more web log records associated with a new call, and predicting, by the processing device, a call topic for the new call based on at least one pattern and the one or more web log records.

In an embodiment, a system for performing data mining may have a processing device and a non-transitory computer-readable storage medium in communication with the processing device. The computer-readable storage medium may contain one or more programming instructions that, when executed, cause the processing device to: (1) for each of a plurality of call log records, associate one or more web log records with the call log record, wherein each web log record comprises a web access and a time stamp, wherein each call log record comprises a call topic and a time stamp, and wherein each of the one or more web log records and the call log record are associated with a user, (2) identify one or more patterns among the web log records for the plurality of call log records, wherein each pattern comprises one or more web accesses, a time stamp at which each web access is performed and the call topic for the call log record, (3) identify one or more web log records associated with a new call, and (4) predict a call topic for the new call based on at least one pattern and the one or more web log records.

In an embodiment, A method of predicting a topic of a call may include providing a web log having a plurality of web log records, wherein each web log record comprises a web access, a time stamp and an associated user, providing a call log having a plurality of call log records, wherein each call log record comprises a call topic, a time stamp and an associated user, for each call log record, associating, by a processing device, one or more web log records with the call log record, wherein the associated user for each of the associated one or more web log records and the call log record are the same, identifying, by the processing device, one or more patterns among the web log records for the plurality of call log records, wherein each pattern comprises one or more web accesses, a time stamp at which each of the one or more web accesses is performed and the call topic for the call log record, identifying, by the processing device, one or more web log records associated with a new call, and predicting, by the processing device, a call topic for the new call based on at least one pattern and the one or more web log records.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

As used herein, the terms "sum," "product" and similar mathematical terms are construed broadly to include any method or algorithm in which a single datum is derived or calculated from a plurality of input data.

A "computing device" refers to a computer, a processor and/or any other component, device or system that performs one or more operations according to one or more programming instructions. An illustrative computing device is described in reference to FIG. 5.

A "call" refers to any type of communication made with the use of a telecommunications device. Examples of calls may include communications conducted by landline telephone, cellular telephone, voice over internet protocol (VoIP), facsimile transmissions, short message service (SMS), multimedia messaging service (MMS), simple mail transfer protocol over transmission control protocol/internet protocol (SMTP over TCP/IP), instant messaging, video messaging, video chat and/or other communications protocols now known or later developed.

"Episode mining" refers to a data analysis process by which patterns are extracted from event log files. Episode mining may extract frequent patterns (episodes), such as user behavior patterns, from an event log file that contains users' activities with a system in a temporal order. Typical event log files include web server access logs, which maintain a history of page requests from users within a time period or session, call history logs from a call center, or the like. Enterprises often desire to analyze event log files to discover valuable information, such as website traffic patterns or user activity patterns by time of day, time of week, time of year, and/or the like. Identified patterns may be used to generate episode rules to predict future events. In general, the event log file may be multiple orders of magnitude larger than the resulting identified patterns.

"Association rule learning" refers to a technique of data mining wherein data is collected without regard to the sequence in which the data is obtained. For example, in the instance of mining web click data, association rule learning may mine patterns (i.e., certain themes from webpages that are clicked), but does not record the sequence of webpages clicked. Thus, if page A, page B and page C are all clicked in one session and all relate to the same category of webpage, association rule learning assigns the same pattern value to the clicks, regardless of whether they appear in the order A-B-C, A-C-B, B-A-C, B-C-A, C-A-B or C-B-A.

In contrast, "sequential pattern mining" works in a similar manner to that of association rule learning, but additionally records the sequence in which the data is obtained. Referring back to the example of web click data, groups of clicked webpages are recorded, as well as the order in which they are clicked. Thus, if page A, page B and page C are all clicked in the same session and all relate to the same category of webpage, then the sequences A-B-C, A-C-B, B-A-C, B-C-A, C-A-B or C-B-A are recorded as distinct from each other. Sequential pattern mining is particularly useful for mining data from web page clicks because of their existing correlation to each other (e.g., a main page may contain a generalized genus of links, and when one of those links is clicked, additional links on the resulting page may be a more specialized species of links).

"Behavioral pattern mining" goes an additional step with sequential pattern mining by evaluating both the sequence of the obtained data, as well as relationships between the times in which the data was obtained. Thus, for example, groups of webpages are monitored for the sequence in which they are clicked, as well as the lengths of time between clicks. Thus, if page A, page B and page C are all clicked in the same session and all relate to the same category of webpage, then, for example, A-B------C is distinct from A-------B-C, wherein each dash refers to an elapsed time period between clicks, such as 10 seconds.

The present disclosure pertains to methods and systems for monitoring a user's website activity to obtain click data for use in predicting subsequent calls made by the user.

Figure 1:
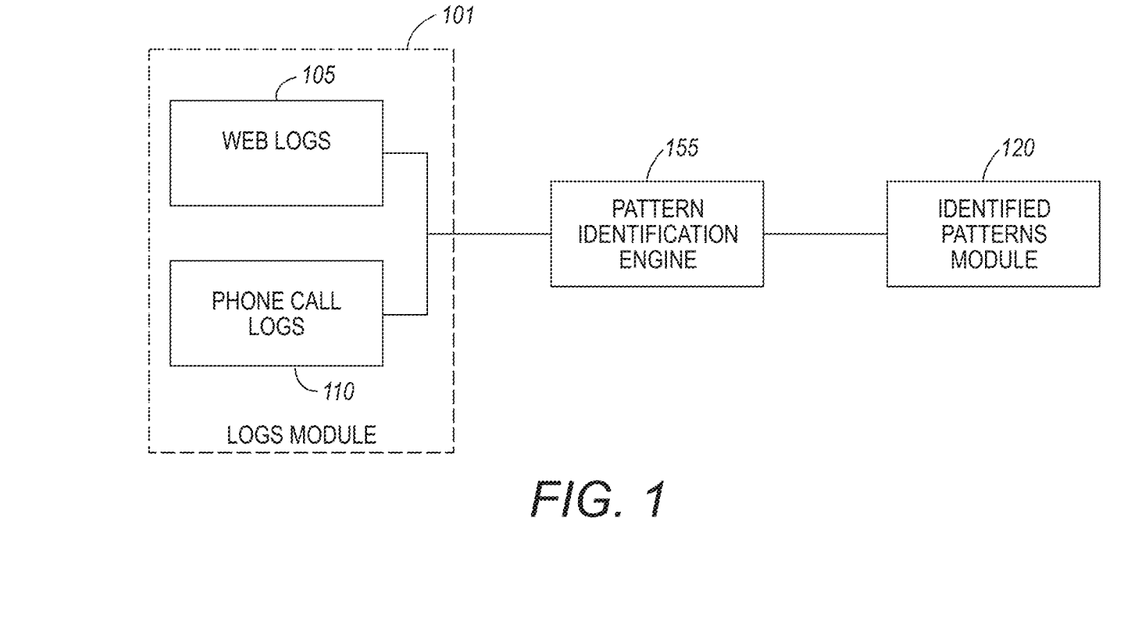
FIG. 1 depicts a block diagram of an illustrative general schematic of a system used for behavioral pattern mining according to an embodiment.

FIG. 1 depicts a general schematic of a system used for behavioral pattern mining. The system may contain a logs module 101, a pattern identification engine 115, and a identified patterns module 120. The logs module 101 may contain a web log 105 and a call log 110.

The web log 105 may generally contain a plurality of web log records. Each web log record may contain information regarding individual users of a website, as well as their use data. More specifically, each web log record may include, but is not limited to, information regarding: (1) the identity of specific computing devices, such as IP addresses and the like; (2) the identity of specific users, such as names, addresses, phone numbers, website login information and/or the like; (3) dates and times a website was accessed (i.e., a time stamp); (4) dates and times specific pages within a website were accessed (i.e., a time stamp); (5) click patterns; and/or (6) specific pages within the website that were accessed. The web log 105 may be contained within a searchable database, knowledge base or the like.

The call log 110 may generally contain a plurality of call log records. Each call log record may contain information regarding calls placed to one or more designated telephone numbers. More specifically, each call log record may include, but is not limited to, information regarding: (1) the identity of specific telephones used to call the one or more designated telephone numbers, such as a number obtained by caller ID and the like; (2) the identity of specific callers, such as names, addresses, phone numbers, website login information and/or the like; (3) dates and times a call was placed (i.e., a time stamp); and/or (4) the topic of each call. The call log 110 may be contained within a searchable database, knowledge base or the like.

The pattern identification engine 115 may conduct a series of three pre-processing steps before calls are received and the topic of the calls are predicted in real-time, as described in more detail herein. The three pre-processing steps may include (1) a data extraction step, (2) a session grouping step and (3) a pattern identification step. In the data extraction step, the pattern identification engine 115 may receive data, such as each call log record and each web log record from the logs module 101 and further extract additional data from the call log records and web log records. In the session grouping step, the pattern identification engine 115 may group sessions of clicks on webpages and calls to one or more monitored telephone lines based upon the times that the clicks and calls were made, as well as whether the same user corresponds to each click and call. In the pattern identification step, the pattern identification engine 115 may identify specific patterns in the topics accessed from the web log 105 that correspond to a topic of a call from the call log 110 within a group that was identified in the session grouping step, as described in more detail herein. Once the pattern identification engine 115 has completed the three pre-processing steps, the data regarding the discovered patterns may be stored in an identified patterns module 120, which can be subsequently accessed for future use, as described in more detail herein.

The identified patterns module 120 may be a database, a knowledge base and/or the like that may be used to store any type of data relating to patterns that have been identified by the pattern identification engine 115. The identified patterns module 120 may be contained within a memory that is located within a computing device or is in operable communication with a computing device. The identified patterns module 120 may alternatively be contained within a memory that is stored in a remote location and accessed remotely, such as over the internet, via a communications port, as described in greater detail herein.

Figure 2:
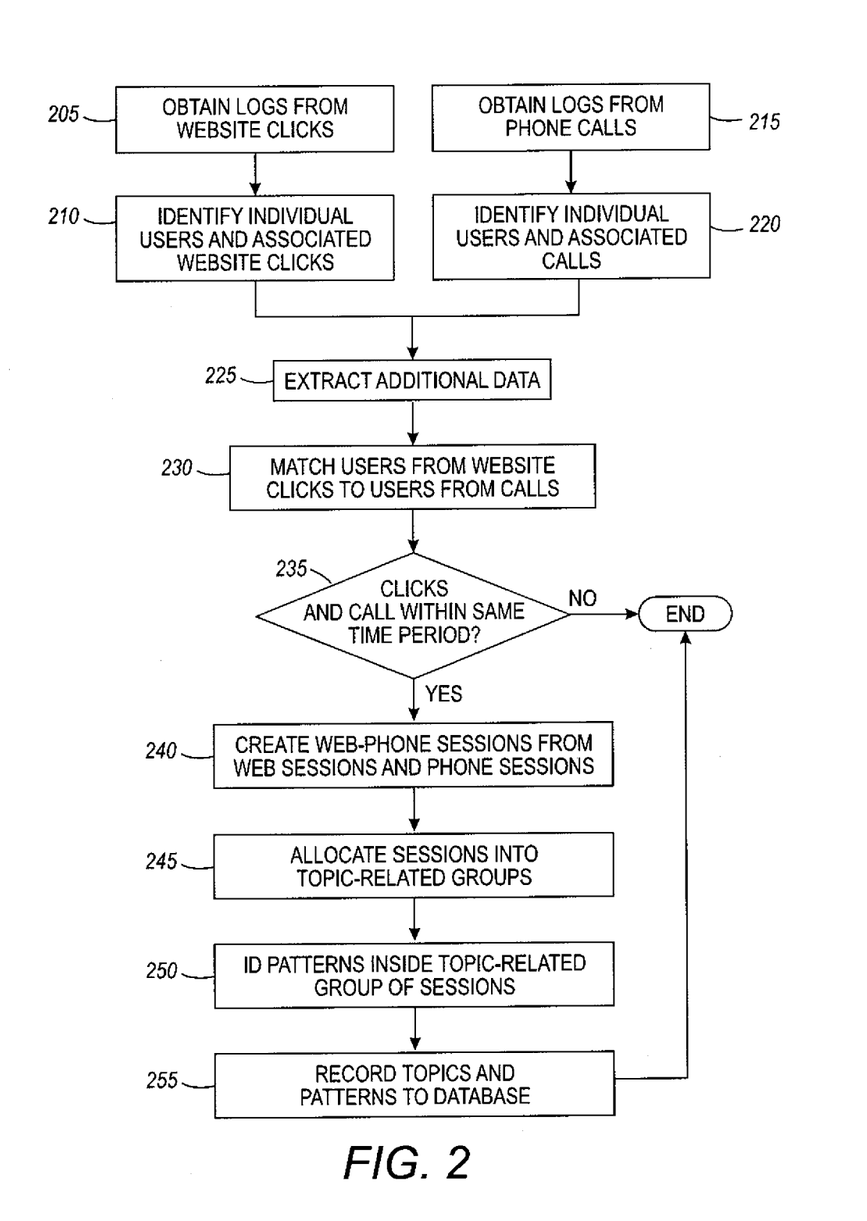
FIG. 2 depicts a flow chart of a process for grouping clicks and calls together according to an embodiment.

The pattern identification engine 115 may use a process for grouping clicks and calls together, as depicted in FIG. 2. The pattern identification engine may obtain logs from website clicks 205 and may identify individual users and click patterns 210. Individual users may be discovered by any method now known or later developed for identifying unique users over the Internet. Examples of such methods may include, but are not limited to, viewing the internet protocol (IP) address of a computer used to browse a website and/or recording a user's login information as used to obtain access to a secure portion of a website and installing browser cookies that contain unique identifiers for each individual user's computer.

Click patterns may be identified by any method now known or later developed for determining what pages on a website an individual user may be visiting. Examples of such methods may include, but are not limited to, click tracking or the like. Click tracking may involve a web server providing an interactive interface to a user, and storing click information, such as a user ID, a uniform resource locator (URL) clicked, a timestamp, an internet protocol (IP) address and/or the like as a file, such as a log file.

At substantially the same time or at a time after the website clicks have been obtained and identified, the pattern identification engine may obtain logs from calls 215 and identify users and call patterns from the call log 220. Calls may be monitored, tracked and/or identified using any method now known or later developed for all calls placed to a specific telephone number or numbers, such as customer support numbers and the like. Examples of call monitoring, tracking and/or identification methods may include, but are not limited to, caller ID monitoring and/or tracking of numbers from phones used to call the customer support number, querying a caller by use of an automated system or a representative to determine the identity of the caller, and/or the like.

Once the click patterns 210 and the call patterns 220 have been identified, the pattern identification engine may extract additional data 225 from the website and call log. Additional data may include, but is not limited to, dates and times that web pages and websites were accessed and dates and times that calls were placed.

The pattern identification engine may use the dates and times data to discover correlations between website clicks and calls placed by individual users, and thus match a user's clicks and calls together 230. Matching website clicks and calls may require the engine to determine whether the clicks and calls were made by the same user in both instances, as well as whether the clicks occurred within the same time period as the calls 235. The "same time period" may be a period of time that has elapsed between the last click and the first call conducted by a user. The period of time may be set based upon a reasonable amount of time it would take a user to navigate a website to solve a problem, get an answer to a question and the like, fail to find a solution, and call a representative to get a solution. For example, the period of time may be less than 10 minutes, less than 20 minutes, less than 30 minutes, less than 45 minutes or less than 60 minutes.

A method for pre-determining the period of time may include calculating an average time gap between the phone call and the last web click. The calculating may be completed by averaging the time gap among all users or among a portion of the users. The calculating may further be completed by averaging the time gap for only specific types of clicks and calls (i.e., clicks and calls regarding a specific subject), or may be completed by averaging the time gap for all calls, regardless of subject.

Figure 4:
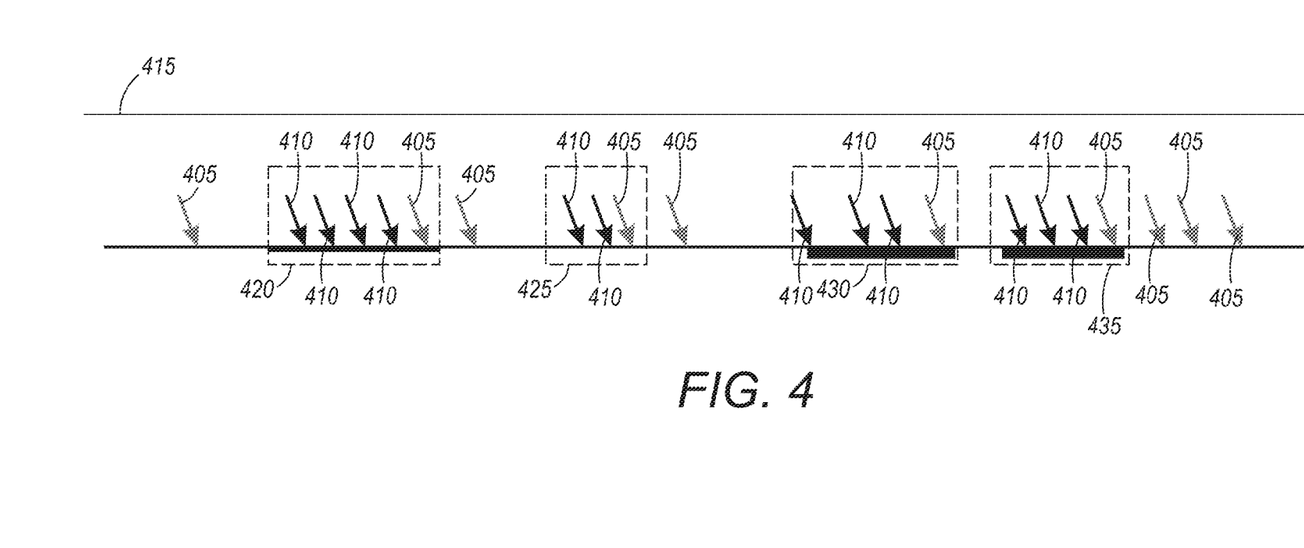
FIG. 4 depicts a schematic of grouped clicks and calls according to an embodiment.

FIG. 4 depicts a series of calls and clicks made by a single identified user over a period of time 415. The solid arrows 410 represent clicks, and the dashed arrows 405 represent calls that are placed. The dashed boxes 420 surrounding a number of the clicks 410 and calls 405 represent clicks and calls that occur within the same time period, as described herein. Accordingly, the pattern identification engine recognizes the clicks 410 and calls 405 within the same time period 420 as being related to each other, and the clicks 410 and calls 405 falling outside the time periods 420 (i.e., outside the dashed boxes) are not related, and thus are labeled as "noise" and are dismissed.

Noise, as used herein, refers to random unwanted data, such as clicks or calls, that are isolated in their occurrences and do not correspond to surrounding data, such as relevant clicks and/or calls. One such example of a click that may be deemed to be noise includes, but is not limited to, clicks where the customer does not remain on the page for a significant period of time, such as, for example, more than 5 seconds, more than 10 seconds or more than 30 seconds. The pattern identification engine may view this as being a "misclick," where the user mistakenly clicks on the wrong link and immediate clicks on his/her browser's back button or clicks on another link to move to the originally intended page.

Referring to FIG. 2, if the user's clicks and calls fall within the same time period, the pattern identification engine may pair each matching web session and phone session into a singular web-phone session 240 and analyze the web-phone sessions to discover a general topic of the web-phone session. Examples of web-phone session general topics may vary, depending on the industry in which the present disclosure is implemented. For example, in a corporate HR department website and phone system, examples of web-phone session general topics may include, but are not limited to, payroll information, benefits information, paid leave information, sick time information and/or the like.

The pattern identification engine may allocate each web-phone session to a general topic group of web-phone sessions containing similar general topics 245. Thus, to use the example from above, web-phone sessions may be allocated to one of the following general topic groups based on their general topic: payroll group, benefits group, paid leave group and sick time group.

The pattern identification engine may identify patterns in each web-phone session in a general topic group of sessions and further allocate the web-phone sessions into patterns within each general topic group 250. Using the examples from above, examples of patterns within the benefits general topic group may include patterns that lead to information such as health insurance information, dental insurance information, vision insurance information and 401(k) information.

The information relating to web-phone sessions, including information relating to the user, date and time, general topic and pattern, may be stored in a database, knowledge base or the like for future reference and retrieval 255. Additionally, the process described herein may be an actively changing process; thus, the process may be repeated by the pattern identification engine in real-time, thus allowing the general topic groups and sub-topic groups to dynamically change as more clicks and calls are recorded and analyzed. Accordingly, general topic groups and patterns may shrink and expand according to the identification of new web-phone sessions and the removal of web-phone sessions that are no longer needed and/or used, such as web-phone sessions relating to an obsolete webpage that has been removed. Additionally, new general topic groups and patterns may be created as needed, such as whenever a new topic of web-phone session is determined.

Figure 3:
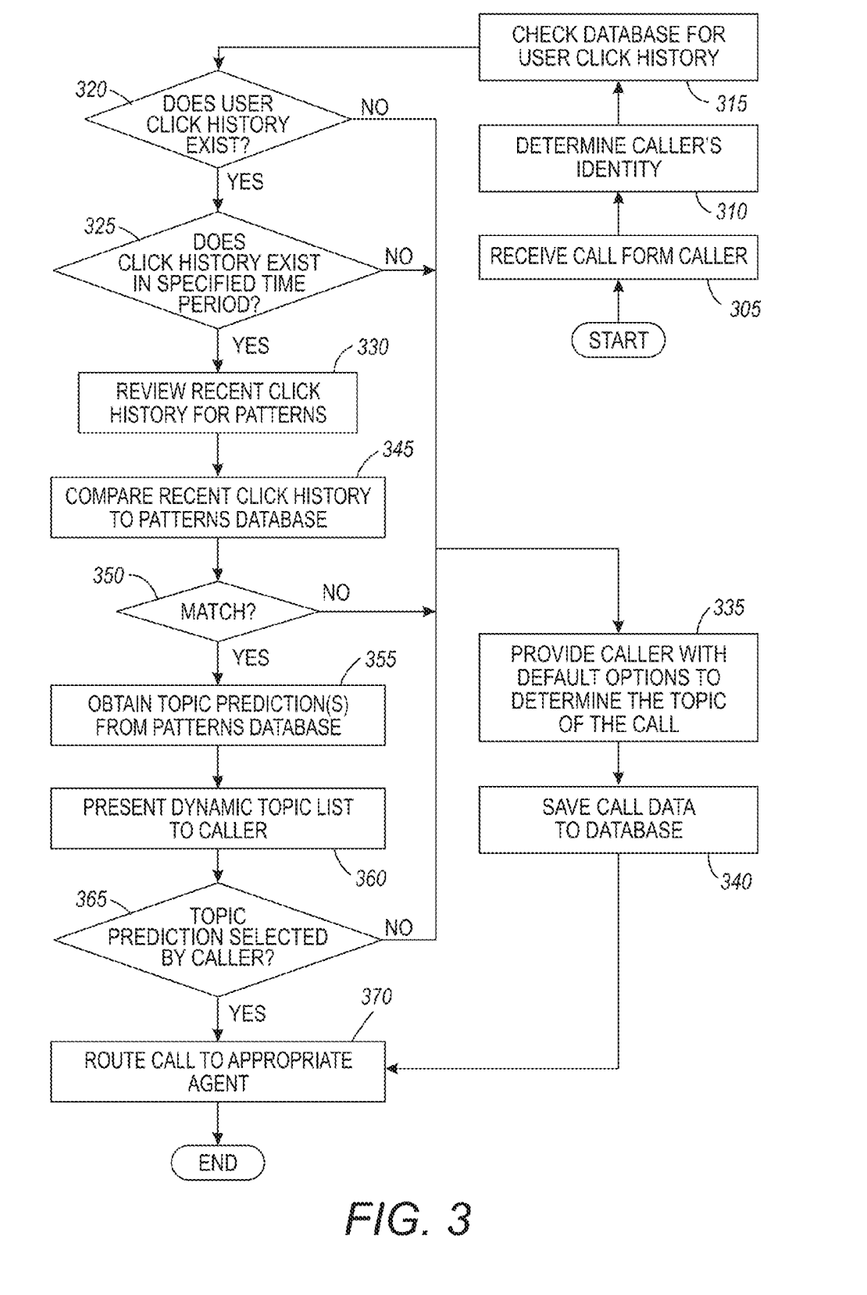
FIG. 3 depicts a flow chart of a process for receiving calls and predicting the topic of each call according to an embodiment.

FIG. 3 depicts a method that may be used by a computing device to predict the topic of a call based upon a customer's previous web clicks. A call may be received from a user 305. The call may be received at a telephone number, internet protocol (IP) address, screen name or the like. The computing device may determine the caller's identity 310. The caller's identity may be garnered via caller ID and/or using an interactive voice response system, as described in more detail herein. The caller's identity may be matched to a user identifier, so that the caller's click history may be located in a database for website click history 315.

The computing device may first determine whether user click history for the caller exists 320, and if so, whether the click history is within the same time period as the current call 325. The time period may be an amount of time that has elapsed between the last relevant click and the placement of the call, as further described herein. If click history for the caller does not exist 320, or if the existing click history is not within the same time period 325, the computing device may use an interactive voice response system and/or the like to discern the topic of the call 335. The computing device may save the call data to a database, knowledge base and/or the like for future reference 340 and route the call to an appropriate agent or system capable of receiving the call based on the topic of the call 370.

If the user click history does exist 320 and it exists within the same time period 325, the computing device may review the recent click history and determine whether any patterns exist 330, as discussed in greater detail herein. The determination of whether any patterns exist may additionally involve accessing a database to compare with the observed patterns of the recent click history 345. If a pattern is not found 350, the computing device may use the interactive voice response system and/or the like to provide the caller with a default set of options to discern the topic of the call 335. The default set of options may be static and may be ordered based on a general likelihood of a topic, with the most likely topics appearing first. For example, if the most likely topic of all callers (regardless of click history) into a system is regarding a 401(k) balance, then a 401(k) option may be presented first. The computing device may save the call data to the database, knowledge base and/or the like for future reference 340 and route the call to an appropriate agent or system capable of receiving the call based on the topic of the call 370.

If a pattern is found 350, the computing device may use the pattern history, as described in greater detail herein, to predict the topic (or topics) of the call 355. The computing device may present a dynamic topic list to the caller 360 as a method of bypassing a lengthy interactive voice response system. The dynamic topic list may include a list of predictions that is ranked according to likelihood of being correct. Thus, the more likely responses may be presented to the caller first, and the less likely responses may be presented to the caller after the more likely responses. The caller may have an option to select whether the predicted topic is correct 365, and if the caller selects an affirmative response, the call may be routed to an appropriate agent or system capable of receiving the call based on the topic of the call 370.

If the caller selects a negative response, the computing device may use the interactive voice response system and/or the like to discern the topic of the call 335. The computing device may save the call data to the database, knowledge base and/or the like for future reference 340 and route the call to an appropriate agent or system capable of receiving the call based on the topic of the call 370.

The pattern identification process may generally discover navigational patterns on the website (i.e., click sequences) that result in a subsequent call by using a "seed and merge" approach that uses a two-step process that may contain a (1) seeding step and (2) a merging step.

The seeding step may involve monitoring web clicks and determining which web clicks are supported by the web-phone session topic-related groups 245 (FIG. 2) and/or determining which web clicks are supported by a group of web-phone sessions containing the same topic 250 (FIG. 2). Thus, the system will determine, for each group, on which clicks in that group each user is spending the most time. Moreover, the order of the clicks may be recorded. From the determination, the system may identify which clicks are "important," i.e., which clicks are highly correlated to the topic of the group.

The merging step may involve analyzing the patterns discovered during the seeding step and merge patterns that are close to each other in terms of their time order. By merging the time-related patterns together, the system may describe a group of web-phone sessions in a more accurate manner, thus achieving greater accuracy in subsequent topic predictions. For example, a number of patterns, such as patterns "A," "B," "D," "E," "M," "P" and "X" may be generated from the seeding step, as well as a time stamp and duration information for each pattern. Each pattern is analyze and a determination is made whether they are closely related based upon the duration information. For example, if pattern "B" occurs immediately after pattern "A" in 70% of all sessions, then pattern "A" and pattern "B" may be merged together to form pattern "A-B." Furthermore, if pattern "D" is adjacent to pattern "B" in terms of time, then pattern "A-B" may be merged with pattern "D" to form pattern "A-B-D." In another example, if pattern "M-P" occurs in 40% of all sessions, and pattern "P-M" occurs in another 40% of all sessions, they may be merged into pattern "{P-M}."

Patterns that are discovered during the seeding step, but cannot be merged during the merging step due to a lack of similar time patterns may nevertheless be stored as an individually "merged" pattern. Thus, for example, a pattern "X" with no other similar patterns to be merged to it, may only be recognized as the exact pattern "X" and may be stored in the database for future access and modification.

Figure 5:
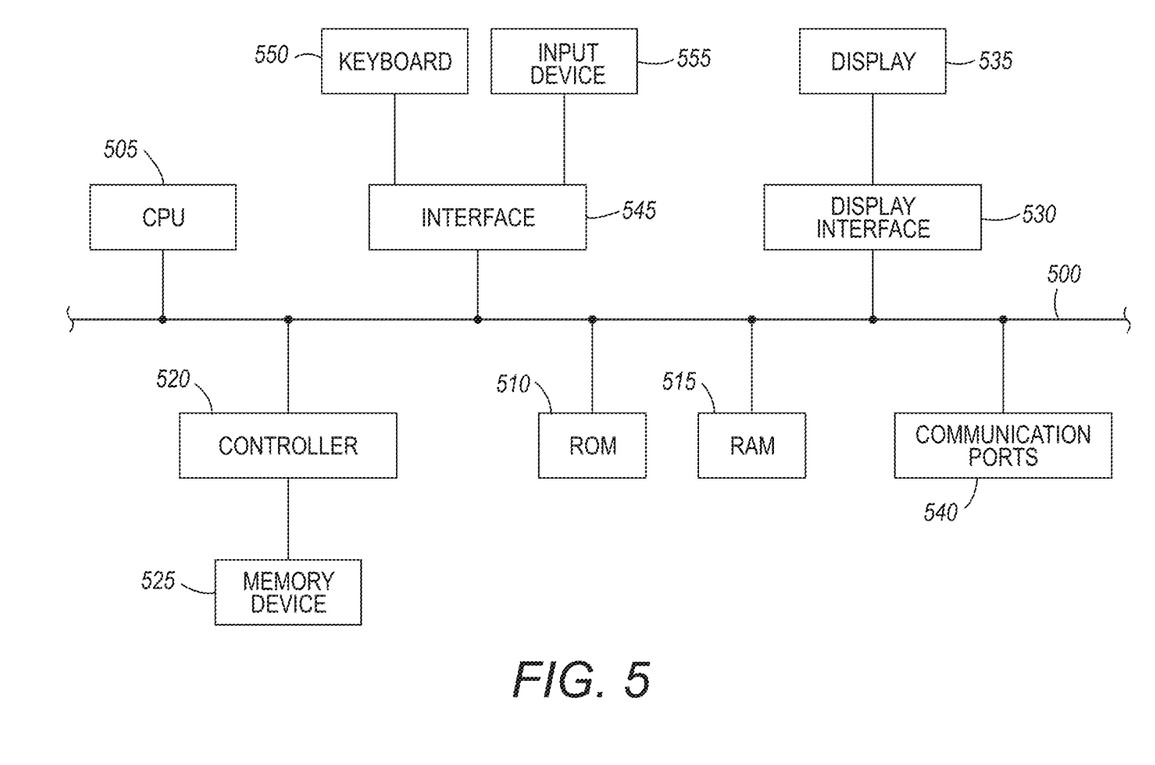
FIG. 5 depicts a block diagram of illustrative internal hardware that may be used to contain or implement program instructions according to an embodiment.

FIG. 5 depicts a block diagram of illustrative internal hardware that may be used to contain or implement program instructions, such as the process steps discussed above in reference to FIGS. 2 and 3, according to embodiments. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an illustrative processing device, computing device or processor as such terms are used within this disclosure. Read only memory (ROM) 510 and random access memory (RAM) 515 constitute illustrative memory devices (i.e., processor-readable non-transitory storage media).

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 530 may permit information from the bus 500 to be displayed on the display 535 in audio, visual, graphic or alphanumeric format. Communication with external devices, such as a print device, may occur using various communication ports 540. An illustrative communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of predicting a topic of a call, comprising:
receiving a web log having a plurality of web log records for a website, wherein each web log record comprises a website access, a time stamp and an identity of a user who accessed the website;
receiving a call log having a plurality of call log records containing information regarding calls placed to one or more telephone numbers, wherein each call log record comprises a call topic, a time stamp and an identity of a user;
grouping, by a pattern identification engine, one or more calls of the call log with one or more website accesses of the web log into a web-phone session so that the user associated with the one or more website accesses of the web log and the user associated with the one or more calls of the call log in the web-phone session are the same user;
identifying, by the pattern identification engine, one or more patterns within a web-phone session by identifying a general topic of the web-phone session based on:
a topic accessed in the one or more website accesses of the web log records of the web-phone session, or
a call topic in the call log records of the web-phone session;
receiving a new call from a caller;
identifying, by the pattern identification engine, that one or more previous website accesses exist in the web log records from the caller associated with the new call;
reviewing the previous website accesses to identify a pattern from a previous web-phone session for one or more of the previous website accesses;
predicting, by the pattern identification engine, a call topic for the new call based on the identified pattern from the previous web-phone session; and
by a processing device, outputting the predicted call topic.

2. The method of claim 1, further comprising:
presenting the predicted call topic to the caller;
receiving, from the caller, an affirmative response that the predicted call topic is correct; and
in response to receiving the affirmative response, routing the new call to an agent or system capable of receiving the new call based on the predicted call topic.

3. The method of claim 1, wherein:
each of the website accesses comprises a time stamp;
each of the call log records comprises a time; and
grouping the one or more calls of the call log with the one or more website accesses of the web log into a web-phone session comprises matching website accesses and call log records that occurred during a same time period.

4. The method of claim 1, wherein identifying the general topic of the web-phone session is based upon one or more website pages that were accessed during the web-phone session.

5. The method of claim 1, wherein each web log record further comprises a plurality of clicks arranged in a sequence, and wherein the identified pattern further comprises a sequence of clicks for one or more website accesses, and a time between each click in the sequence.

6. The method of claim 5, wherein identifying the pattern comprises associating the sequence of clicks with calls to one or more monitored telephone lines made by the same user.

7. The method of claim 3, wherein grouping the one or more calls of the call log with the one or more website accesses of the web log during the same time period also comprises identifying any website accesses that correspond to a mistaken click on an incorrect link.

8. A system for predicting a topic of a call, comprising:
a processing device;
a pattern identification engine;
a logs module comprising:
a web log having a plurality of web log records for a website, wherein each web log record comprises a website access, a time stamp and an identity of a user who accessed the website, and
a call log having a plurality of call log records containing information regarding calls placed to one or more telephone numbers, wherein each call log record comprises a call topic, a time stamp and an identity of a user; and
a non-transitory computer-readable storage medium in communication with the processing device, wherein the computer-readable storage medium contains one or more programming instructions that, when executed, cause the processing device to:
instruct the pattern identification engine to group a call topic of the call log with one or more website accesses of the web log records into a web-phone session so that the one or more website accesses of the web log and the one or more calls of the call log in the web-phone session are from the same user,
instruct the pattern identification engine to identify one or more patterns within the web-phone session by identifying a general topic of the web-phone session based on one or more topics accessed in the one or more website accesses of the web log records of the web-phone session,
receive a new call from a caller who is the same user,
review a previous web-phone session for the caller to identify a pattern for one or more previous website accesses in the previous web-phone session, and
predict a call topic for the new call based on the identified pattern from the one or more previous website accesses; and
output the predicted call topic.

9. The system of claim 8, further comprising additional instructions that, when executed, cause the processing device to:
present the predicted call topic to the caller;
receive, from the caller, an affirmative response that the predicted call topic is correct; and
in response to receiving the affirmative response, route the new call to an agent or system capable of receiving the new call based on the predicted call topic.

10. The system of claim 9, wherein:
each of the website accesses comprises a time stamp;
each of the call log records comprises a time; and the instructions to group the one or more calls of the call log with the one or more website accesses of the web log into the web-phone session comprise instructions to match website accesses and call log records that occurred during a same time period.

11. The system of claim 9, wherein the instructions to identify the general topic of the web-phone session one or more patterns comprise instructions to identify the general topic based upon one or more website pages that were accessed during the web-phone session.

12. The system of claim 8, wherein each web log record further comprises a plurality of clicks arranged in a sequence, and wherein the instructions to identify the pattern further comprise instructions to identify a sequence of clicks for one or more website accesses and a time between each click in the sequence.

13. The system of claim 12, wherein the instructions to identify the pattern comprise instructions to associate the sequence of clicks with calls to one or more monitored telephone lines made by the same user.

14. A method of predicting a topic of a call, the method comprising:
by a pattern identification engine:
accessing a web log having a plurality of web log records, wherein each web log record comprises a website access, a time stamp and an associated user,
accessing a call log having a plurality of call log records, wherein each call log record comprises a call topic, a time stamp and an associated user, and
by a pattern identification engine, extracting one or more web log records from the web log and one or more call log records from the call log;
grouping, by the pattern identification engine, one or more calls of the call log from the extracted call log records with one or more website accesses of the web log from the extracted web log records into a web-phone session so that the user associated with the one or more website accesses of the web log and the user associated with the one or more calls of the call log are the same user;
identifying, by the pattern identification engine, one or more patterns within the web-phone session by identifying a general topic of the web-phone session based on:
a topic accessed in the one or more website accesses of the web-phone session, or
a call topic in the call log records of the web-phone session;

receiving a new call from a caller who is the same user;
identifying, by the pattern identification engine, that one or more previous website accesses exist in the web log records from the caller associated with the new call;
reviewing the previous website accesses to identify a pattern for one or more of the previous website accesses;
predicting, by the pattern identification engine, a call topic for the new call based on the identified pattern from the previous web-phone session; and
by a processing device, outputting the predicted call topic to the caller.

15. The method of claim 14, further comprising:
presenting the predicted call topic to the caller;
receiving, from the caller, an affirmative response that the predicted call topic is correct; and
in response to receiving the affirmative response, routing the new call to an agent or system capable of receiving the new call based on the predicted call topic.

16. The method of claim 14, wherein:
each of the website accesses comprises a time stamp;
each of the call log records comprises a time; and
grouping the one or more calls of the call log with the one or more website accesses of the web log into the web-phone session comprises matching website accesses and call log records that occurred during a same time period.

17. The method of claim 16, wherein identifying the general topic of the web-phone session is based upon the one or more website pages that were accessed during the web-phone session.

18. The method of claim 16, wherein grouping the one or more calls of the call log with the one or more website accesses of the web log during the same time period also comprises identifying any website accesses that correspond to a mistaken click on an incorrect link.

19. The method of claim 14, wherein each web log record further comprises a plurality of clicks arranged in a sequence, and wherein the pattern further comprises a sequence of clicks for one or more website accesses and a time between each click in the sequence.

20. The method of claim 19, wherein the identifying the pattern comprises associating the sequence of clicks with calls to one or more monitored telephone lines made by the same user.

* * * * *